United States Patent
Harris et al.

(10) Patent No.: US 11,645,858 B2
(45) Date of Patent: May 9, 2023

(54) SYSTEMS AND METHODS FOR RAPIDLY DEVELOPING ANNOTATED COMPUTER MODELS OF STRUCTURES

(71) Applicant: Insurance Services Office, Inc., Jersey City, NJ (US)

(72) Inventors: Dave Harris, Orem, UT (US); Ron Richardson, South Jordan, UT (US); Corey David Reed, Cedar Hills, UT (US); Jeffery Devon Lewis, Orem, UT (US); Jeffrey Clayton Taylor, Alpine, UT (US)

(73) Assignee: Insurance Services Office, Inc., Jersey City, NJ (US)

(*) Notice: Subject to any disclaimer, the term of this patent is extended or adjusted under 35 U.S.C. 154(b) by 0 days.

(21) Appl. No.: 16/189,512

(22) Filed: Nov. 13, 2018

(65) Prior Publication Data

US 2019/0147247 A1    May 16, 2019

Related U.S. Application Data

(60) Provisional application No. 62/585,078, filed on Nov. 13, 2017.

(51) Int. Cl.
*G06V 20/64* (2022.01)
*G06T 17/05* (2011.01)
(Continued)

(52) U.S. Cl.
CPC ............ *G06V 20/64* (2022.01); *G06Q 40/08* (2013.01); *G06T 17/05* (2013.01); *G06T 19/00* (2013.01);
(Continued)

(58) Field of Classification Search
CPC ........... G06K 9/00671; G06K 9/00201; G06K 9/00637; G06K 9/00214; G06T 17/05;
(Continued)

(56) References Cited

U.S. PATENT DOCUMENTS

| | | | |
|---|---|---|---|
| 5,701,403 A | * | 12/1997 | Watanabe ............... G06T 17/10 345/419 |
| 6,446,030 B1 | | 9/2002 | Hoffman et al. |

(Continued)

FOREIGN PATENT DOCUMENTS

| | | |
|---|---|---|
| WO | 2014/151122 A1 | 9/2014 |
| WO | 2016/154306 A1 | 9/2016 |
| WO | 2017/100658 A1 | 6/2017 |

OTHER PUBLICATIONS

International Search Report of the International Searching Authority dated Feb. 11, 2019, issued in connection with International Application No. PCT/US18/60762 (3 pages).

(Continued)

*Primary Examiner* — Jon Chang
(74) *Attorney, Agent, or Firm* — McCarter & English, LLP

(57) ABSTRACT

Systems and methods for rapidly developing annotated computer models of structures and properties is provided. The system generates three-dimensional (3D) models of structures and property using a wide variety of digital imagery, and/or can process existing 3D models created by other systems. The system processes the 3D models to automatically identify candidate objects within the 3D models that may be suitable for annotation, such as roof faces, chimneys, windows, gutters, etc., using computer vision techniques to automatically identify such objects. Once the candidate objects have been identified, the system automatically generates user interface screens which gather relevant information related to the candidate objects, so as to rapidly (Continued)

obtain, associate, and store annotation information related to the candidate objects. When all relevant annotation information has been gathered and associated with model objects, the system can create a list of materials that can be used for future purposes, such as repair and/or reconstruction of real-world structures and property.

24 Claims, 9 Drawing Sheets

(51) Int. Cl.
  G06Q 40/08 (2012.01)
  G06T 19/00 (2011.01)
  G06V 20/10 (2022.01)
  G06Q 10/10 (2023.01)
(52) U.S. Cl.
  CPC ........... *G06V 20/176* (2022.01); *G06Q 10/10* (2013.01); *G06T 2219/004* (2013.01)
(58) Field of Classification Search
  CPC ... G06T 19/00; G06T 2219/004; G06Q 40/08; G06Q 10/10; G06V 20/64; G06V 20/176; G06V 20/653
  See application file for complete search history.

(56) References Cited

U.S. PATENT DOCUMENTS

| | | |
|---|---|---|
| 6,448,964 B1 | 9/2002 | Isaacs et al. |
| 8,533,063 B2 | 9/2013 | Erickson |
| 8,843,304 B1 | 9/2014 | Dupont et al. |
| 8,868,375 B1 | 10/2014 | Christian |
| 8,983,806 B2 | 3/2015 | Labrie et al. |
| 9,158,869 B2 | 10/2015 | Labrie et al. |
| 9,501,700 B2 | 11/2016 | Loveland et al. |
| 9,679,227 B2 | 6/2017 | Taylor et al. |
| 10,127,670 B2 | 11/2018 | Lewis et al. |
| 10,181,079 B2 | 1/2019 | Labrie et al. |
| 10,289,760 B1 | 5/2019 | Oakes, III et al. |
| 10,387,582 B2 | 8/2019 | Lewis et al. |
| 10,445,438 B1 | 10/2019 | Motonaga et al. |
| 10,529,028 B1 | 1/2020 | Davis et al. |
| 11,314,905 B2 | 4/2022 | Childs et al. |
| 2002/0116254 A1 | 8/2002 | Stein et al. |
| 2003/0009315 A1 | 1/2003 | Thomas et al. |
| 2007/0080961 A1 | 4/2007 | Inzinga et al. |
| 2007/0276626 A1 | 11/2007 | Bruffey |
| 2009/0179895 A1* | 7/2009 | Zhu ........................ G06F 40/169 345/424 |
| 2010/0110074 A1 | 5/2010 | Pershing |
| 2010/0114537 A1 | 5/2010 | Pershing |
| 2010/0296693 A1 | 11/2010 | Thornberry et al. |
| 2011/0056286 A1 | 3/2011 | Jansen |
| 2011/0157213 A1 | 6/2011 | Takeyama et al. |
| 2011/0191738 A1 | 8/2011 | Walker et al. |
| 2012/0026322 A1 | 2/2012 | Malka et al. |
| 2012/0179431 A1 | 7/2012 | Labrie et al. |
| 2012/0253725 A1 | 10/2012 | Malka et al. |
| 2012/0253751 A1 | 10/2012 | Malka et al. |
| 2013/0201167 A1 | 8/2013 | Oh et al. |
| 2013/0206177 A1 | 8/2013 | Burlutskiy |
| 2013/0226451 A1 | 8/2013 | O'Neill et al. |
| 2013/0262029 A1 | 10/2013 | Pershing |
| 2013/0314688 A1 | 11/2013 | Likholyot |
| 2014/0043436 A1 | 2/2014 | Bell et al. |
| 2014/0195275 A1 | 7/2014 | Pershing et al. |
| 2014/0301633 A1 | 10/2014 | Furukawa et al. |
| 2014/0320661 A1 | 10/2014 | Sankar et al. |
| 2015/0029182 A1 | 1/2015 | Sun et al. |
| 2015/0073864 A1 | 3/2015 | Labrie et al. |
| 2015/0093047 A1 | 4/2015 | Battcher et al. |
| 2015/0116509 A1 | 4/2015 | Birkler et al. |
| 2015/0153172 A1 | 6/2015 | Starns et al. |
| 2015/0193971 A1 | 7/2015 | Dryanovski et al. |
| 2015/0213558 A1 | 7/2015 | Nelson |
| 2015/0227645 A1 | 8/2015 | Childs et al. |
| 2015/0269438 A1 | 9/2015 | Samarasekera et al. |
| 2015/0302529 A1 | 10/2015 | Jagannathan |
| 2016/0098802 A1 | 4/2016 | Bruffey et al. |
| 2016/0110480 A1 | 4/2016 | Randolph |
| 2016/0246767 A1* | 8/2016 | Makadia ................. G06T 19/00 |
| 2016/0282107 A1 | 9/2016 | Roland et al. |
| 2017/0124713 A1 | 5/2017 | Jurgenson et al. |
| 2017/0132711 A1 | 5/2017 | Bruffey et al. |
| 2017/0132835 A1 | 5/2017 | Halliday et al. |
| 2017/0169459 A1 | 6/2017 | Bruffey et al. |
| 2017/0193297 A1 | 7/2017 | Michini et al. |
| 2017/0206648 A1 | 7/2017 | Marra et al. |
| 2017/0221152 A1 | 8/2017 | Nelson et al. |
| 2017/0316115 A1 | 11/2017 | Lewis et al. |
| 2017/0330207 A1 | 11/2017 | Labrie et al. |
| 2017/0345069 A1 | 11/2017 | Labrie et al. |
| 2018/0053329 A1* | 2/2018 | Roberts ................... G06T 19/00 |
| 2018/0067593 A1 | 3/2018 | Tiwari et al. |
| 2018/0089833 A1 | 3/2018 | Lewis et al. |
| 2018/0286098 A1 | 10/2018 | Lorenzo |
| 2018/0330528 A1* | 11/2018 | Loveland ............. G01C 21/206 |
| 2018/0357819 A1* | 12/2018 | Oprea ..................... G06T 17/00 |
| 2018/0373931 A1* | 12/2018 | Li ........................ G06Q 40/08 |
| 2019/0114717 A1 | 4/2019 | Labrie et al. |
| 2019/0221040 A1 | 7/2019 | Shantharam et al. |
| 2019/0340692 A1 | 11/2019 | Labrie et al. |
| 2019/0377837 A1 | 12/2019 | Lewis et al. |
| 2020/0100066 A1 | 3/2020 | Lewis et al. |
| 2020/0143481 A1 | 5/2020 | Brown et al. |
| 2021/0076162 A1 | 3/2021 | Wang et al. |
| 2021/0103687 A1 | 4/2021 | Harris et al. |
| 2021/0350038 A1 | 11/2021 | Jenson et al. |
| 2022/0309748 A1 | 9/2022 | Lewis et al. |

OTHER PUBLICATIONS

Written Opinion of the International Searching Authority dated Feb. 11, 2019, issued in connection with International Application No. PCT/US18/60762 (7 pages).

U.S. Appl. No. 62/512,989, filed May 31, 2017 entiitled, "Systems and Methods for Rapidly Developing Annotated Computer Models of Structures" (47 pages).

Extended European Search Report dated Jul. 1, 2021, issued by the European Patent Office in connection with European Application No. 18876121.7 (8 pages).

Invitation to Pay Additional Fees issued by the International Searching Authority dated Feb. 2, 2022, issued in connection with International Application No. PCT/US21/63469 (2 pages).

Extended European Search Report dated Feb. 18, 2022, issued in connection with European Patent Application No. 19866788.3 (9 pages).

Office Action dated Dec. 27, 2021, issued in connection with U.S. Appl. No. 16/580,741 (13 pages).

Notice of Allowance dated Dec. 16, 2021, issued in connection with U.S. Appl. No. 14/620,004 (12 pages).

International Search Report of the International Searching Authority dated Mar. 27, 2017, issued in connection with International Application No. PCT/US2016/65947 (3 pages).

Written Opinion of the International Searching Authority dated Mar. 27, 2017, issued in connection with International Application No. PCT/US2016/65947 (7 pages).

Office Action dated Sep. 26, 2018, issued in connection with U.S. Appl. No. 15/374,695 (33 pages).

Notice of Allowance dated May 13, 2019, issued in connection with U.S. Appl. No. 15/374,695 (7 pages).

Extended European Search Report dated Jun. 11, 2019, issued in connection with European Patent Application No. 16873975.3 (8 pages).

Communication Pursuant to Article 94(3) EPC issued by the European Patent Office dated Apr. 22, 2020, issued in connection with European Patent Application No. 16873975.3 (6 pages).

(56) References Cited

OTHER PUBLICATIONS

International Search Report of the International Searching Authority dated Dec. 12, 2019, issued in connection with International Application No. PCT/US2019/52670 (3 pages).
Written Opinion of the International Searching Authority dated Dec. 12, 2019, issued in connection with International Application No. PCT/US2019/52670 (5 pages).
Office Action dated Feb. 5, 2020, issued in connection with U.S. Appl. No. 16/580,741 (15 pages).
International Search Report of the International Searching Authority dated May 14, 2015, issued in connection with International Application No. PCT/US15/015491(3 pages).
Written Opinion of the International Searching Authority dated May 14, 2015, issued in connection with International Application No. PCT/US15/015491 (9 pages).
Fung, et al., "A Mobile Assisted Localization Scheme for Augmented Reality," Department of Computer Science and Engineering, The Chinese University of Hong Kong, 2012 (76 pages).
Sankar, et al., "Capturing Indoor Scenes With Smartphones," UIST'12, Oct. 7-10, 2012, Cambridge, Massachusetts (9 pages).
Office Action dated Aug. 8, 2017, issued in connection with U.S. Appl. No. 14/620,004 (26 pages).
Office Action dated Aug. 28, 2018, issued in connection with U.S. Appl. No. 14/620,004 (33 pages).
Farin, et al., "Floor-Plan Reconstruction from Panoramic Images," Sep. 23-28, 2007, MM '07, ACM (4 pages).
Office Action dated Mar. 29, 2019, issued in connection with U.S. Appl. No. 14/620,004 (22 pages).
Office Action dated Dec. 10, 2019, issued in connection with U.S. Appl. No. 14/620,004 (27 pages).
Zhang, et al., "Wallk&Sketch: Create Floor Plans with an RGB-D Camera," Sep. 5-8, 2012, UbiComp '12, ACM (10 pages).
Office Action dated Jul. 8, 2020, issued in connection with U.S. Appl. No. 14/620,004 (27 pages).
Office Action dated Sep. 22, 2020, issued in connection with U.S. Appl. No. 16/580,741 (14 pages).
Office Action dated Feb. 2, 2021, issued in connection with U.S. Appl. No. 14/620,004 (28 pages).
Communication Pursuant to Article 94(3) EPC issued by the European Patent Office dated Feb. 18, 2021, issued in connection with European Patent Application No. 16/873,975.3 (5 pages).
Examination Report No. 1 dated Mar. 30, 2021, issued by the Australian Patent Office in connection with Australian Patent Application No. 2016366537 (6 pages).
Office Action dated Apr. 21, 2021, issued in connection with U.S. Appl. No. 16/580,741 (15 pages).
Notice of Allowance dated Aug. 19, 2021, issued in connection with U.S. Appl. No. 14/620,004 (11 pages).
Examiner-Initiated Interview Summary dated Aug. 10, 2021, issued in connection with U.S. Appl. No. 14/620,004 (1 page).
Office Action dated Mar. 25, 2022, issued in connection with U.S. Appl. No. 16/545,607 (56 pages).
International Search Report of the International Searching Authority dated Apr. 8, 2022, issued in connection with International Application No. PCT/US21/63469 (5 pages).
Written Opinion of the International Searching Authority dated Apr. 8, 2022, issued in connection with International Application No. PCT/US21/63469 (6 pages).
Dino, et al., "Image-Based Construction of Building Energy Models Using Computer Vision," Automation in Construction (2020) (15 pages).
Fathi, et al., "Automated As-Built 3D Reconstruction of Civil Infrastructure Using Computer Vision: Achievements, Opportunities, and Challenges," Advanced Engineering Informatics (2015) (13 pages).
International Search Report of the International Searching Authority dated Jul. 25, 2022, issued in connection with International Application No. PCT/US22/22024 (3 pages).
Written Opinion of the International Searching Authority dated Jul. 25, 2022, issued in connection with International Application No. PCT/US22/22024 (5 pages).
Office Action dated Sep. 2, 2022, issued in connection with U.S. Appl. No. 16/580,741 (13 pages).
Office Action dated Oct. 13, 2022, issued in connection with U.S. Appl. No. 16/545,607 (53 pages).
International Search Report of the International Searching Authority dated Nov. 18, 2022, issued in connection with International Application No. PCT/US22/030691 (6 pages).
Written Opinion of the International Searching Authority dated Nov. 18, 2022, issued in connection with International Application No. PCT/US22/030691 (11 pages).
Notice of Allowance dated Dec. 9, 2022, issued in connection with U.S. Appl. No. 17/705,130 (10 pages).
Examination Report No. 1 dated Dec. 15, 2022, issued by the Australian Patent Office in connection with Australian Patent Application No. 2021282413 (3 pages).
Communication Pursuant to Article 94(3) EPC dated Jan. 31, 2023, issued in connection with European Patent Application No. 16873975.3 (8 pages).
Notice of Allowance dated Feb. 14, 2023, issued in connection with U.S. App. No. 17/705,130 (5 pages).

\* cited by examiner

| Actions | Estimate Defaults | User Defaults | Items |

Roof Face

Action: [ None ▶ ]

Ridge Cap

Action: [ None ▶ ]

Ridge Vent

Action: [ None ▶ ]

Reflective Tube

Action: [ None ▶ ]

| Actions | Estimate Defaults | User Defaults | Items |

Roof Face

| Action: | Replace Existing ▼ |
| New Material Type: | Composition ▼ |
| Composition Type: | Laminated Shake Look ▼ |
| Quality: | Unknown ▼ |
| Removal: | Same as New Roof ▼ |

Drip Edge

| Eave: | None/Leave Existing ▼ |

Underlayment

| Ice/Water Shield Action: | Replacement (None - See defaults) ▼ |
| Felt: | Unknown ▼ |

Flashing

| Side Wall Action: | None ▼ |

Starter Course

| Eave: | Laminated Double Layer ▼ |

Ridge Cap

| Action: | Replace ▼ |
| Type: | Standard Profile Comp. ▼ |

Ridge Vent

| Action: | Detach and Reshingle ▼ |
| Shingle Type: | Standard Profile Comp. ▼ |
| Full Reshingle: | Yes ▼ |

Reflective Tube:

| Action: | Replace Rashing Only ▼ |

| Actions Estimate Defaults User Defaults | Items | | |
|---|---|---|---|
| All Items ▼ | | | |

| Act | Description | Qty | Unit Price | Total |
|---|---|---|---|---|
| - | Lam. Shake Look | 3.63/SQ | $37.95 | $137.76 |
| - | Steep Charge (7/12 - 9/12) | 3.63/SQ | $7.76 | $28.17 |
| + | Felt (15#) | 3.63/SQ | $21.17 | $76.85 |
| + | Starter (Lam. Dbl Layer) | 7.2/LF | $3.71 | $26.71 |
| + | Reflective Tube Flashing | 4/EA | $24.85 | $99.40 |
| + | Lam. Shake Look | 4.25/SQ | $262.85 | $1,117.11 |
| + | Steep Charge (7/12 - 9/12) | 4.08/SQ | $25.41 | $103.67 |
| + | Ridge Cap (Comp High Prof) | 29.47/LF | $4.56 | $134.38 |
| + | Ridge Vent - Detach & Reset | 5.97/LF | $4.49 | $26.81 |
| & | Ridge Cap (Comp High Prof) | 5.97/LF | $6.12 | $36.54 |

FIG. 8

SYSTEMS AND METHODS FOR RAPIDLY DEVELOPING ANNOTATED COMPUTER MODELS OF STRUCTURES

CROSS-REFERENCE TO RELATED APPLICATIONS

This application claims the benefit of U.S. Provisional Patent Application No. 62/585,078, filed on Nov. 13, 2017, the entire disclosure of which is expressly incorporated herein by reference.

BACKGROUND

Field of the Disclosure

The present disclosure relates to computer modeling of structures and property. More specifically, the present disclosure relates to systems and methods for rapidly developing annotated computer models of structures.

Related Art

It is well-known in the field of computer-aided design (CAD) to utilize software products to create computer models of structures. Indeed, for many years, computers have been used to develop models of structures and property for various purposes. For example, various, customized software packages have been developed for many years which allow insurance companies, contractors, and other entities, to create models of structures and properties. One such example is the XACTIMATE software package, which is widely used in the insurance claims processing industry to create computerize models of buildings and materials for purposes of repairing and replacing structures due to property damage and other causes.

In addition to the above, there have been rapid advances in the fields of computer-generated models of structures and property by applying computer vision techniques to digital imagery (e.g., aerial imagery, satellite imagery, etc.) to create three-dimensional (3D) models of such structures. Examples of widely-used software packages which generate such models from aerial imagery include the GEOMNI ROOF and GEOMNI PROPERTY software packages. These systems create complex, three-dimensional models of structures by processing features in aerial images.

While the advent of computer vision techniques have made the process of creating models of structures (and property) easier to accomplish than was previously possible, there is still a need to rapidly create annotated computer models of structures, e.g., models of buildings, property, and other structures which not only accurately model the real-world structures that they represent, but also are annotated with rich information delineating real-world attributes relating to such structure. Accordingly, the systems and methods of the present disclosure address these shortcomings of existing technologies.

SUMMARY

The present disclosure relates to systems and methods for rapidly developing annotated computer models of structures and property. The system can generate three-dimensional (3D) models of structures and property using a wide variety of digital imagery, and/or can process existing 3D models created by other systems. The system processes the 3D models to automatically identify candidate objects within the 3D models that may be suitable for annotation, such as roof faces, chimneys, windows, gutters, etc., using computer vision techniques to automatically identify such objects. Additionally, for each identified object, the system also automatically searches for and identifies additional related objects that may be suitable candidates for annotation. Once the candidate objects have been identified, the system automatically generates user interface screens which gather relevant information related to the candidate objects, so as to rapidly obtain, associate, and store annotation information related to the candidate objects. Additionally, the system dynamically adjusts questions presented to users in the user interface screens so as to increase the speed with which relevant information is obtained from users and associated with the objects of the model. When all relevant annotation information has been gathered and associated with model objects, the system can create a list of materials that can be used for future purposes, such as repair and/or reconstruction of real-world structures and property.

BRIEF DESCRIPTION OF THE DRAWINGS

The foregoing features of the disclosure will be apparent from the following Detailed Description, taken in connection with the accompanying drawings, in which:

FIGS. 5-6 are screenshots illustrating sample user interface screens generated by the system for allowing annotation of selected objects of the model;

FIG. 8 is a screenshot illustrating a materials and price list automatically generated by the system based on the annotated model generated by the system.

DETAILED DESCRIPTION

The present disclosure relates to systems and methods for rapid development of annotated computer models of structures and property, as described in detail below in connection with FIGS. 1-9.

Figure 1:
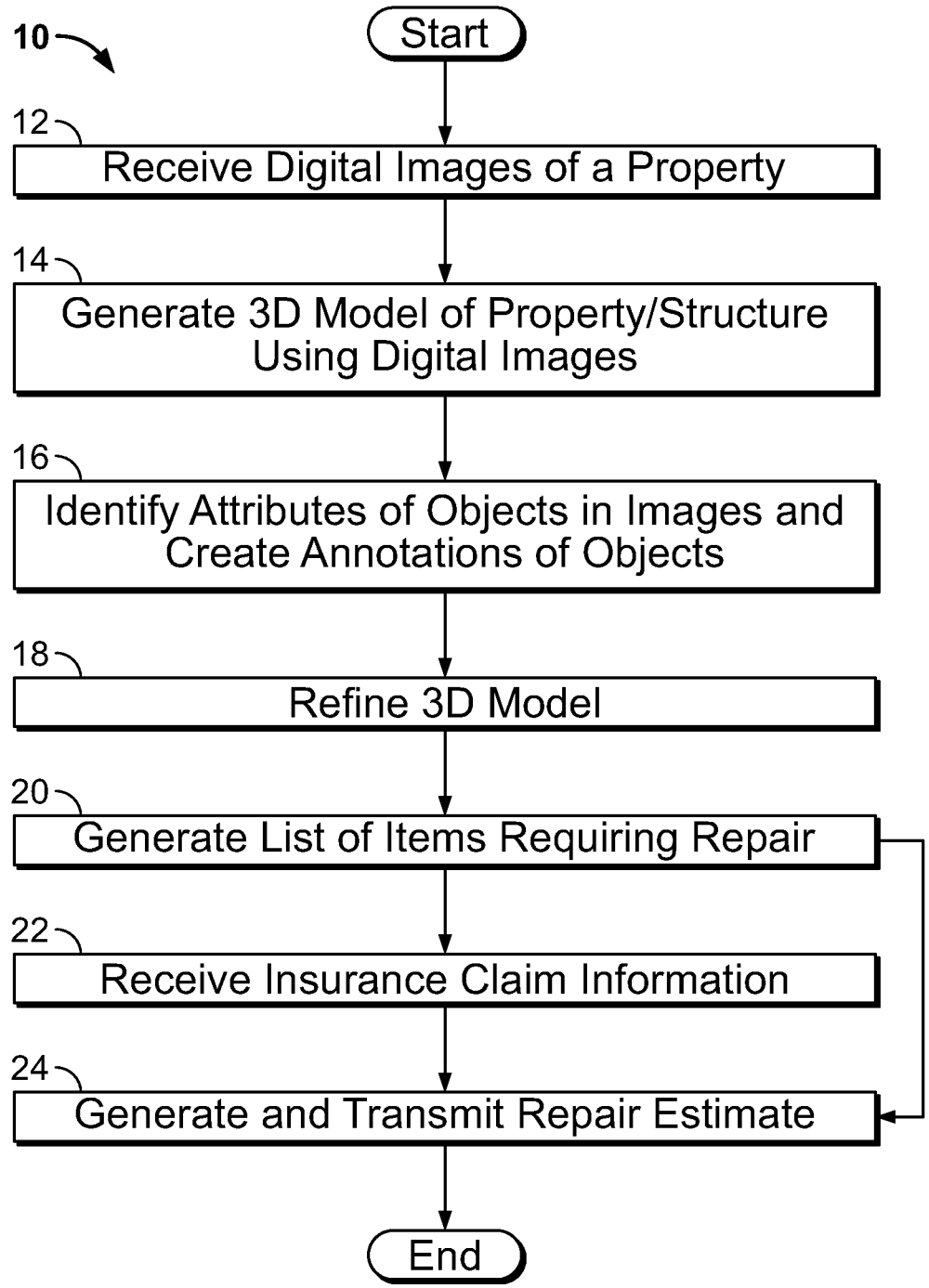
FIG. 1 is a flowchart illustrating high-level processing steps carried out by the system of the present disclosure.
Figure 2:
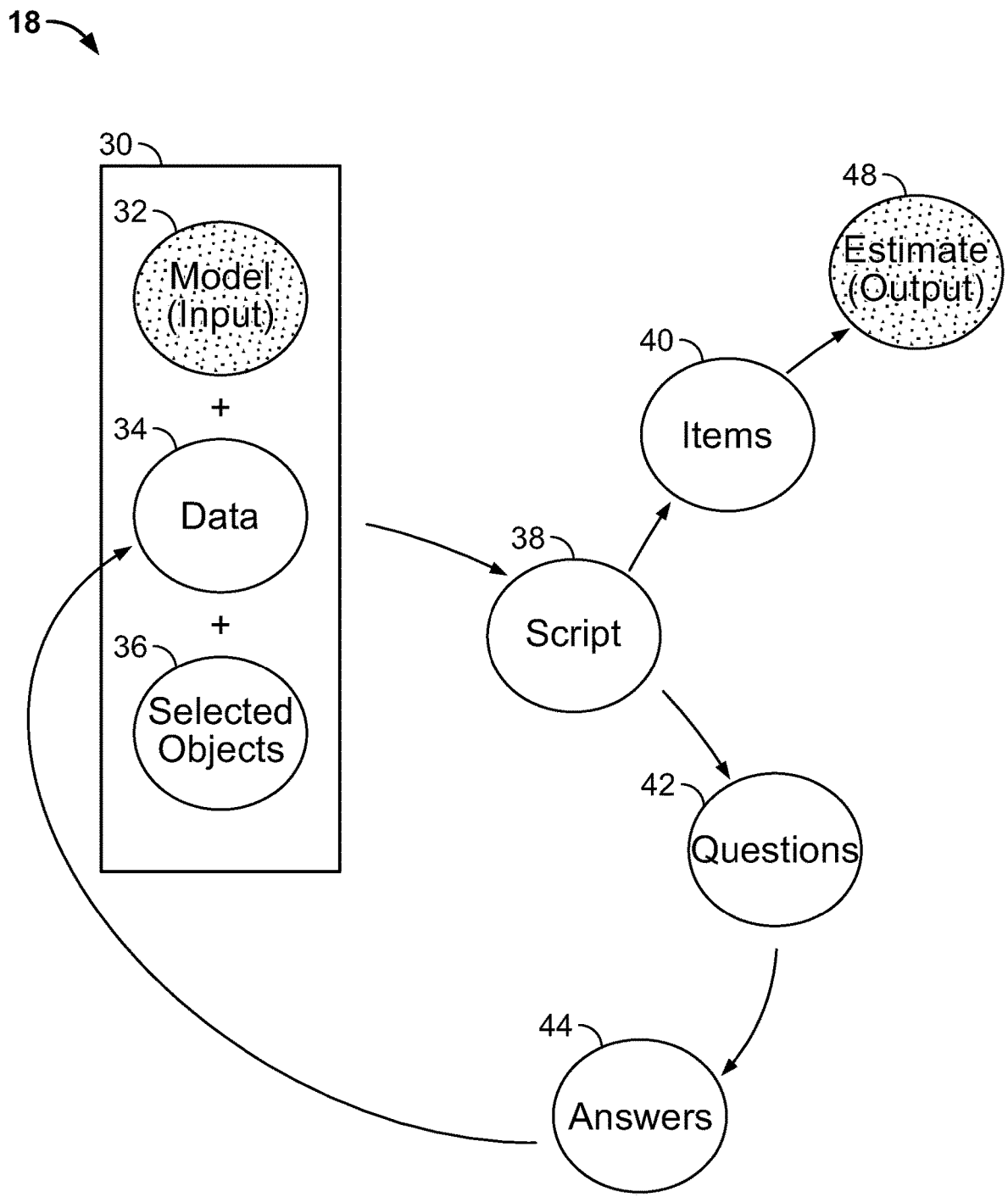
FIG. 2 is a diagram illustrating processing step 18 of FIG. 1 in greater detail.

FIG. 1 is a diagram illustrating overall process steps carried out by the system, indicated generally at 10. As noted above, the system of the present disclosure provides a single, unified, computer-based tool and associated user interface which allows a user to rapidly and accurately generate detailed, annotated, object-based models of properties and structures. Beginning in step 12, the system could receive one or more digital images of a property. Such images could be stored locally, retrieved from a database (local or remote), and/or retrieved from a third-party digital imagery provider's computer system(s). Images of a property could be gathered from many possible sources including, but not limited to, satellites, aircraft, drones, and from ground-based cameras. As each image is captured, a set of metadata could be generated by the system, which describes the image. The metadata can include, but is not limited to: GPS coordinates, altitude, direction of the camera, angle of the camera, camera intrinsic parameters, date and time of capture, etc. The actual image and the metadata for that image are stored together by the system as an image "set." A group of image sets could then be combined into a package associated with a particular location. Such a package can be stored (e.g., on a server) and retrieved on demand. While the system of the present disclosure is not limited by any particular techniques for acquiring digital images and associated metadata (and, indeed, the system could utilize images that have already been acquired and processed to include metadata, e.g., from a third party imagery provider), one example of a technique for acquiring images of structures and properties is disclosed in co-pending U.S. Provisional Application Ser. No. 62/512, 989, the entire disclosure of which is expressly incorporated by reference herein in its entirety.

In step 14, the images and metadata (package) can be processed by the system using one or more computer vision algorithms to create a three-dimensional (3D) model of the property/structure, as well as damage to such property/structure. It is noted that the system need not create a 3D model from aerial images, and indeed, the system could receive and process a previously-created 3D model that is transmitted to the system from another computer, if desired. If it is desired to create a 3D model from multiple images of the same property, there are numerous ways that such a 3D model can be generated. Known software tools can be used which perform sophisticated image processing algorithms to automatically extract the information from the images and generate the model. Other software tools allow operators to manually generate the models with some computer assistance. Still other tools use a combination of automatically generated and manually generated models. In any case, the result is a raw geometric model consisting of polygons, line segments and points. If the system is utilized to generate a 3D model from the aerial imagery, various techniques could be used by the system to carry out such modeling, including but not limited to, one or more of the techniques disclosed in issued U.S. Pat. Nos. 9,679,227 and 9,501,700; published PCT Application No. PCT/US2016/065947; and U.S. patent application Ser. No. 15/277,359, the entire disclosures of which are expressly incorporated herein by reference, or any other suitable techniques.

In step 16, the system identifies attributes of objects in the property, and annotates the 3D model of the property/structure. In particular, in this step, the system automatically identifies components of the 3D model, such as points, lines, panels, geometric shapes, and free shapes, as candidates for annotation. For example, the system could automatically include points of the model as candidate structures for annotation as roof vents, lines of the model as candidate structures for annotation as gutters, panels (planar sections) of the model as candidate structures for annotation as skylights or windows, and various geometric shapes as candidates for annotation as other structures such as trees, vegetation, etc. Such automatic selection of objects of the 3D model as candidates for annotation could be accomplished using known computer vision techniques such as edge detection and classification techniques, region growing techniques, machine learning, etc. Such attributes and associated annotation(s) can include, but are not limited to:

Point elements for annotation: roof vents, finials, HVAC, bin containers, etc.
Line elements to annotate: rain gutters, cornices, ridge vents, railings, etc.
Panel elements to annotate: solar skylights, panels, entrances, garage doors, windows, etc.
Geometric shapes to annotate: roads, pools, sport courts, trampolines, etc.
Free shapes to annotate: trees, vegetation, etc.

Any elements can have specific features associated therewith. For example, exterior walls could be made from brick, stone, stucco, metal or some other material. Roofs could be made from asphalt shingles, ceramic tile, shake, metal, etc. Roof vents could be turbine, turtle or some other type of vent. When the features are associated with a candidate object for annotation, they are stored as part of the annotation. The annotation information can be generated manually, through an automated process, or through some combination of the two. The automated process utilizes computer vision and machine learning techniques. The automated annotations can be broken into two types: structural and non-structural annotations. Structural annotations are elements that are attached to the 3D model of a structure. Examples of structural annotations are: roof vents, skylights, solar panels and roof materials. Non-structural annotations are those not related to any 3D model. Examples of non-structural annotations are: pools, trees, trampolines, and concrete flatwork.

When annotations are entered manually, the system assists the operator in identifying, locating and entering elements associated with real-world items into the model. The system projects properly-oriented models onto different images of the property from different sources and orientations, to assist the user with annotation. The operator can then interact with the tool by adding a new property feature to the model, removing an existing property feature, or adding additional information about an existing property feature. These manual annotations can be entered at the time of the model creation or anytime afterward.

In step 18, the system refines the 3D model after attributes of objects in the model have been identified and annotated, as noted above. An interactive process is implemented in step 18, and is illustrated in greater detail in connection with FIG. 2. In step 30, the model 32, associated model data 34, and selected objects 36 are processed by a script 38 which automatically generates a list of items 40 and questions 42 to be answered by the user of the system. The model 32 is the 3D representation of a property and the real world objects associated with it as described previously. The data 34 represents the "pre-filled" annotation information supplied through an automated process, manually by an operator and/or the information gleaned from the answers to the questions for each of the property objects. The selected objects 36 provide the operator with the ability to select one or more property objects. This allows the operator to focus his attention on one thing or aspect of the property at a time. The script 38 directs the information coming from the combination of the model, the data and the selected objects to form a set of questions which is presented to the operator. The questions 42 prompt the operator for input details related to the selected objects. Only questions relevant to the selected objects and to previously answered questions are shown to the operator, in response to which the operator provides answers 44. The answers 44 are then saved with the model 30. Changes in data 34 may cause the script to perform a different set of steps, therefore at each question change, the process is cycled and a potentially new set of questions is generated. The items 40 represent a listing of the real world purchasable items and quantities for all property objects. This list is then passed to the estimate 48 as the final output for this given process. External to the process, the list of generated items is then associated with a price for the area where the property exists. Given the item prices, the quantity, the taxes, and other information relevant to the claim (such as deductible), an estimate of the cost to replace and the indemnity to the policy holder can be created.

Turning back to FIG. 1, once the model has been refined in step 18, in step 20 the system generates the list of items 40 as noted above. Then, in step 22, the system could optionally process insurance claim information, if desired. Finally, in step 24, the system processes both the list of items requiring repair and any insurance claim information to generate and transmit a repair estimate.

Figure 3:
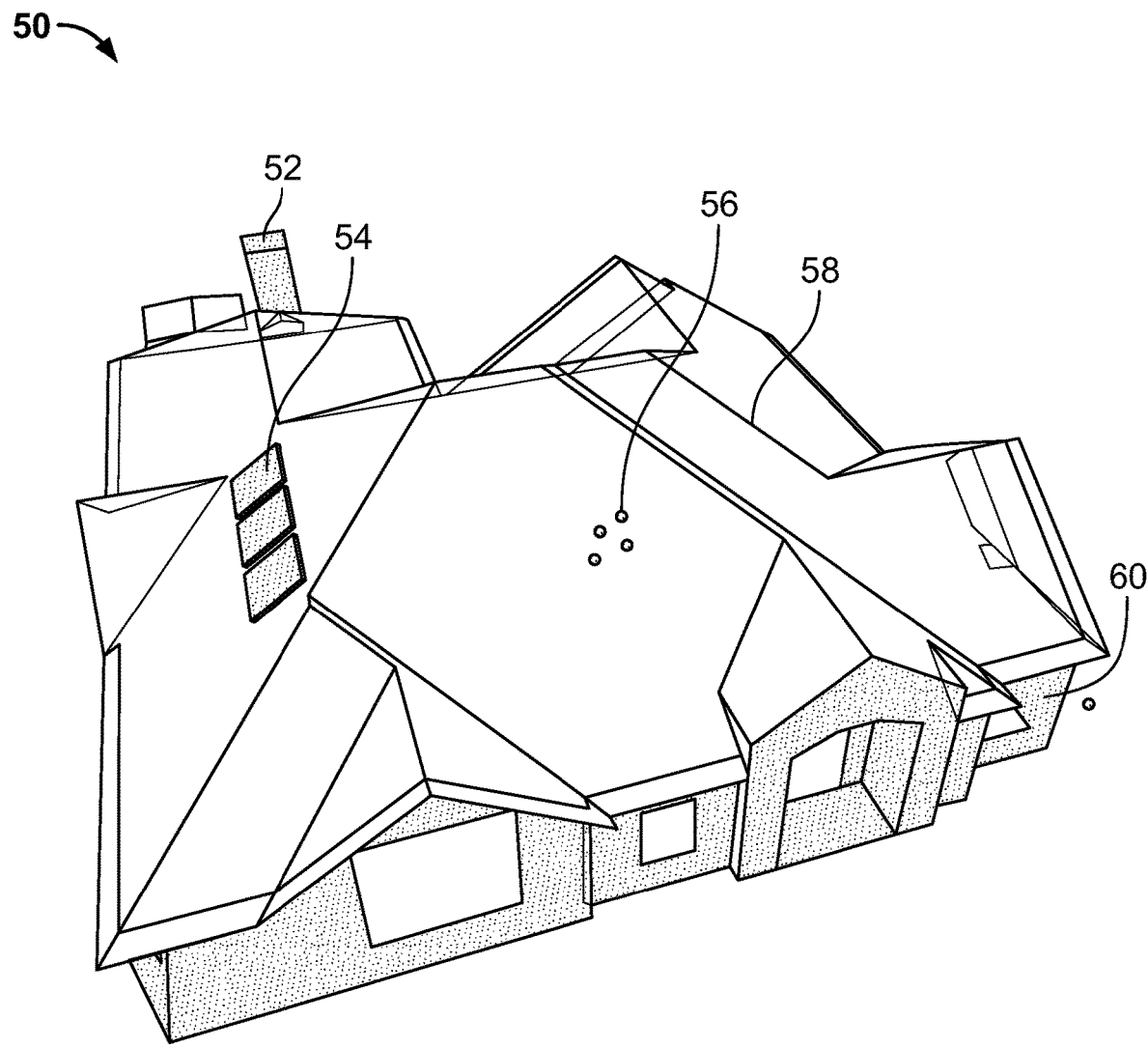
FIGS. 3-4 are diagrams illustrating visualizations of the computer models generated by the system of the present disclosure, including candidate objects automatically identified by the system for annotation.

FIG. 3 is a diagram showing a visualization of the model, indicated generally at 50. Various colors could be included in the model to represent the types of property objects. Red lines, for example, could represent roof valleys, blue lines (58) could represent roof ridges, green lines could represent eaves and rakes, etc. Any desired type of indicia could be used to indicate different roof elements. The rectangles 54 of the model represent skylights. The rectangle 52 could represent a chimney top, and the green dots 56 could represent roof vents. Walls 60 could also be represented in the model 50. Connected together, the operator can match the real world objects with the model as it is stored internally in memory in a computer system.

Figure 4:
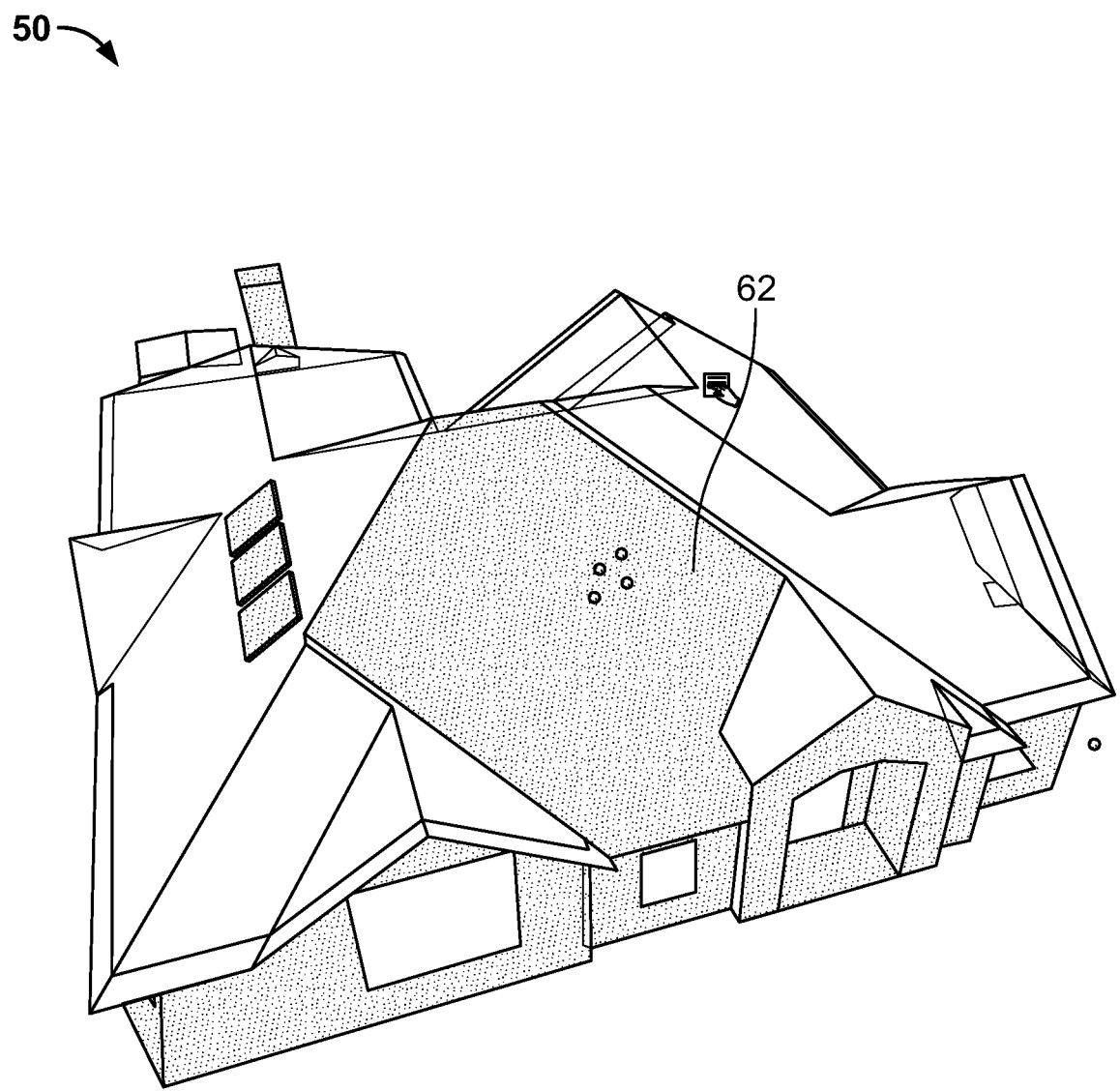

As shown in FIG. 4, the user interface of the system provides the user with the ability to select an object of the model by clicking on it, and to define attributes of that object and to annotate the object. As shown, the user can select a roof face 62 of the model 50 by clicking on the face 62. The face 62 is highlighted to provide feedback to differentiate the selected object. To assist the operator, all touching lines and enclosed single roof objects (in this case vents) can automatically be included by the system, and automatically identified as objects that are candidates for annotation as described below. Indeed, for example, when the user clicks on the roof face 62, the system searches for all objects in the model, such as ridge vents, gutters, underlayments, etc., that contact or form part of the roof face 62, and automatically labels those objects as candidates for further annotation. Thus, since the system automatically (through computer vision techniques) delineates candidate objects in the model for annotation, the system rapidly increases the efficiency and speed with which annotated computer models of structures are developed.

The annotation process enabled by the system of the present disclosure will now be described in greater detail. When the user clicks on the object (roof face) 62, the user interface of the system automatically generates a user interface screen 70 as shown in FIG. 5. Given the model, the data, and the selected information, a software script of the system can automatically generate a set of appropriate questions as shown in the screen 70 of FIG. 5. The user must first determine what repairs need to be done with the roof face 62. If no information has been "pre-filled" in this regard, the script presumes that nothing will be done unless the operator specifically selects an action. However, as shown in the user interface screen 70 of FIG. 6, if the user desires to take an action, the user can do so using the various drop-down boxes which are automatically generated by the system. For this example, the operator can pick the drop down action of "Replace Existing" as shown in FIG. 6. This causes the screen 70 to automatically generate further questions to be answered by the user using drop-down boxes, such as specifying the new type of roof material to be used, composition type of the roof material, quality of the roof material, information relating to removal of the material, etc.

By processing the user's answer to generate further questions, the system recycles the process and causes the automatic regeneration of a set of questions as illustrated in FIG. 6. Having determined that the roof is going to be replaced, the user interface 70 automatically generates questions which show the user that it is also possible to replace the drip edge, the flashing, the starter course and other material associated with replacing the face, as prompted by the additional questions and drop-down boxes shown in FIG. 6.

Note that the "New Material Type" question shown in the user interface 70 in FIG. 6 contains the value of "Composition" and the "Composition Type" question contains the value of "Laminated Shake Look". This is part of the "pre-filled" data that was obtained at the time the property model was created. The operator does not need to pick an answer to these questions unless the "pre-fill" data were incorrectly determined. The quality question under the "Composition Type" has a current answer of "Unknown" for purposes of illustration only. That piece of information could be supplied by the operator by inspecting the property in person, looking at receipts, or by other means, if desired.

Figure 7:
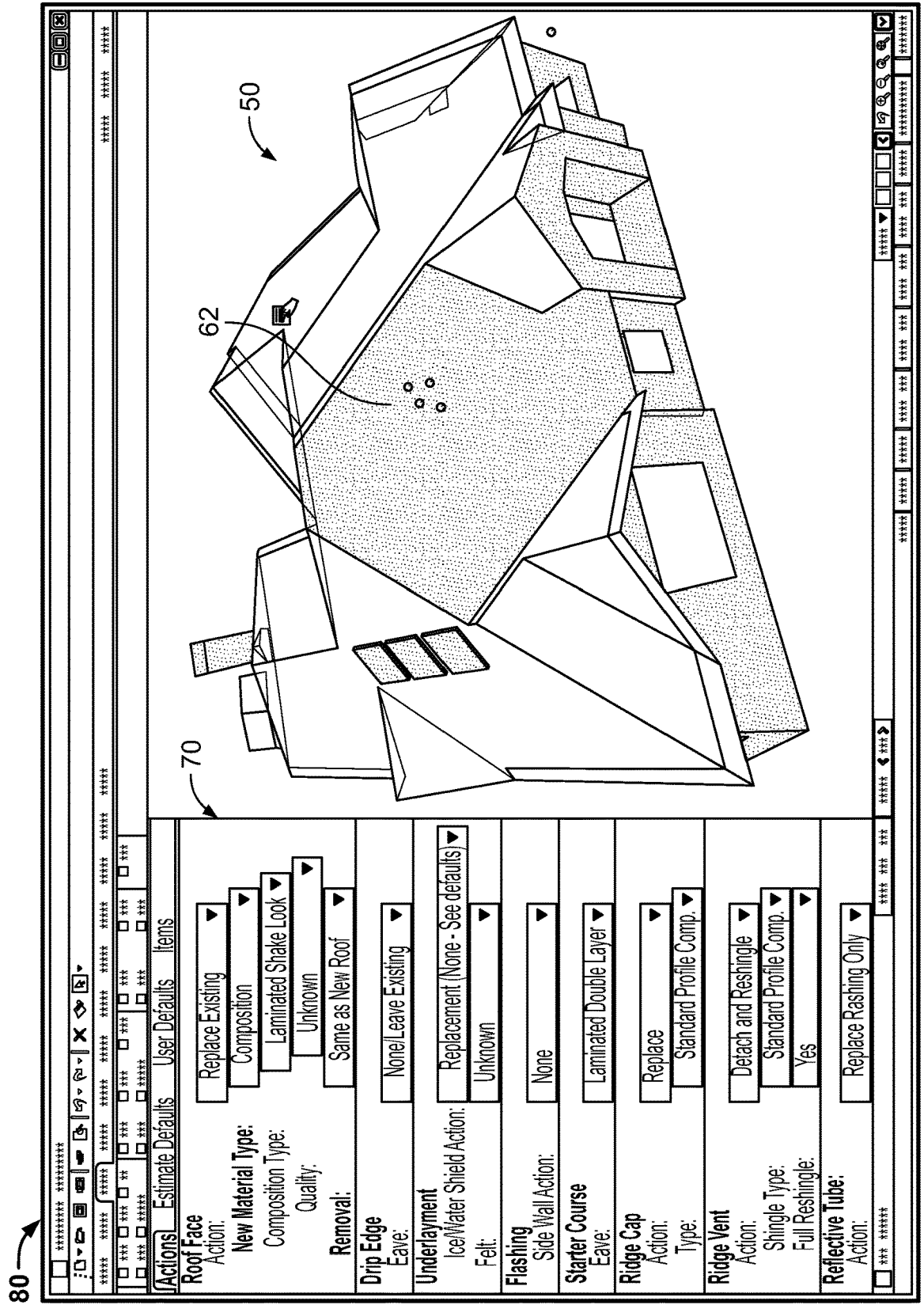
FIG. 7 is a screenshot illustrating a unified user interface generated by the system of the present disclosure, wherein the user can select candidate objects of the model and create associated annotations in a single user interface.

FIG. 7 illustrates a unified user interface 80 generated by the system, which allows the user to interact in a single user interface with the 3D model 50 of the structure as well as the user interface screen 70 for annotating the model and specifying information about objects of the model, as discussed above, using targeted responses to questions automatically generated by the system. Each answer to a question provided by the user (e.g., by changing selections of the pull-down prompts in response to associated questions) cycles the process back to regenerating the questions dynamically, thus providing a rich user interface which elicits the most relevant information from the user related to objects in the model. The process continues iteratively until the operator has picked an answer for each question for each object (such that multiple objects can be selected at once). In so doing, the system allows for the rapid generation of annotated computer models of structures and property.

As part of the iterative process, a set of real-world items is generated each time an answer to a question is changed. This is illustrated in the version of the user interface 70 shown in FIG. 8. As can be seen, the user interface 70 displays items that can be purchased for the purpose of repairing the property. The unit pricing could be provided by an estimation software package. Furthermore, the resultant items list can be linked to an insurance claims software and an estimation software package to generate the insurance estimate.

Figure 9:
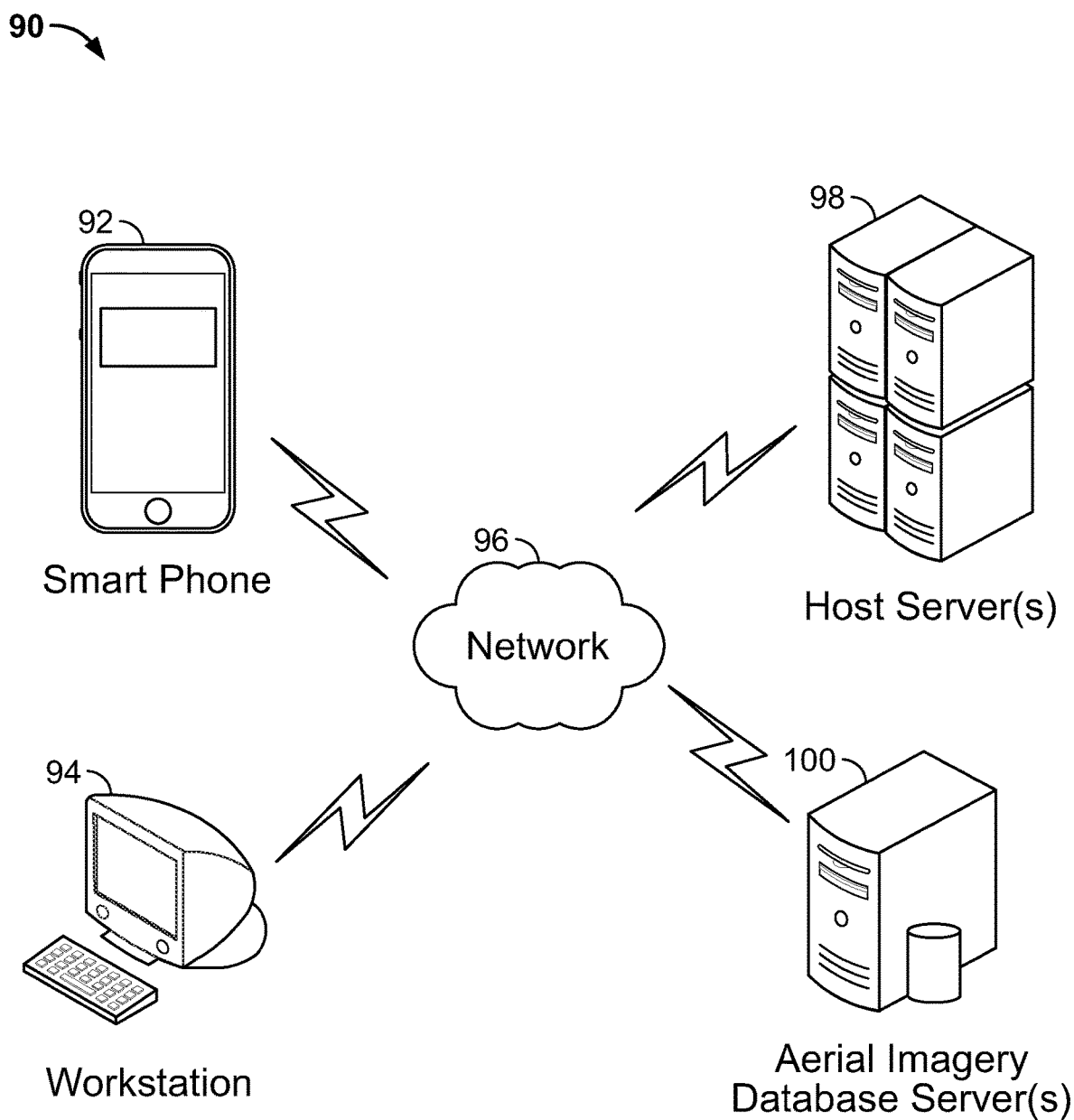
FIG. 9 is a diagram illustrating sample hardware components on which the system of the present disclosure could be implemented.

FIG. 9 is a diagram illustrating sample hardware components 90 on which the present invention could be implemented. The system could be implemented on a computer system using any suitable programming language such as C, C++, C#, Java, Python, or other suitable programming language, and could be embodied as computer-readable and executable code executed by a suitable computer system, such as one or more host servers 98. Such servers could be cloud-based servers that are accessible from one or more user devices such as smart phones 92 or workstations 94 which are in communication with the servers 98 via a network 96 (e.g., over the Internet). The servers 98 could also communicate with one or more aerial imagery database servers 100 in order to obtain and process aerial imagery to generate 3D models of structures and property depicted in such imagery, as disclosed herein. Still further, the system of the present disclosure could be implemented entirely on an end-user device if desired, in the form of a program installed on and executed by the phone 92 and/or workstation 94.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A method for rapidly developing an annotated computer model of a structure, comprising the steps of:
receiving at a computer system a plurality of digital images;
processing the plurality of digital images at the computer system to generate a three-dimensional model of the structure;
processing by the computer system the three-dimensional model of the structure, the computer system automatically identifying elements of the model as candidate features for annotation;
displaying the three-dimensional model and the candidate features of the three-dimensional model in a display in communication with the computer system;
allowing a user to select at least one of the candidate features in the display;
in response to the user selecting the at least one of the candidate features in the display, processing the three-dimensional model using computer vision to search for and automatically identify all objects in the three-dimensional model that contact or form part of the at least one of the candidate features; and
allowing the user to annotate the identified objects.

2. The method of claim 1, wherein the step of processing the three-dimensional model to automatically identify elements of the model comprises identifying a point element as one of a roof vent, a finial, an HVAC element, or a bin container.

3. The method of claim 1, wherein the step of processing the three-dimensional model to automatically identify elements of the model comprises identifying line elements as rain gutters, cornices, ridge vents, or railings.

4. The method of claim 1, wherein the step of processing the three-dimensional model to automatically identify elements of the model comprises identifying panel elements as solar skylights, panels, entrances, garage doors, or windows.

5. The method of claim 1, wherein the step of processing the three-dimensional model to automatically identify elements of the model comprises identifying geometric shapes as roads, pools, sport courts, or trampolines.

6. The method of claim 1, wherein the step of processing the three-dimensional model to automatically identify elements of the model comprises identifying free shapes as trees or vegetation.

7. The method of claim 1, further comprising refining the model based on annotations provided by the user.

8. The method of claim 7, further comprising generating a list of items requiring repair based on the annotations provided by the user.

9. The method of claim 8, further comprising receiving insurance claim information based on the annotations provided by the user.

10. The method of claim 9, further comprising generating and transmitting a repair estimate for repairing the list of items requiring repair.

11. The method of claim 1, further comprising automatically storing attributes associated with the automatically identified elements of the model.

12. The method of claim 1, further comprising displaying candidate features associated with a surface face of the three-dimensional model in the display based on a surface face selected by the user.

13. A system for rapidly developing an annotated computer model of a structure, comprising:
an aerial imagery database including a plurality of digital images; and
a computer system in communication with the aerial imagery database, the computer system:
processing the plurality of digital images to generate a three-dimensional model of the structure;
processing by the computer system the three-dimensional model of the structure, the computer system automatically identifying elements of the model as candidate features for annotation;
displaying the three-dimensional model and the candidate features of the three-dimensional model in a display in communication with the computer system;
allowing a user to select at least one of the candidate features in the display;
in response to the user selecting the at least one of the candidate features in the display, processing the three-dimensional model using computer vision to search for and automatically identify all objects in the three-dimensional model that contact or form part of the at least one of the candidate features; and
allowing the user to annotate the identified objects.

14. The system of claim 13, wherein the computer system automatically identifies a point element as one of a roof vent, a finial, an HVAC element, or a bin container.

15. The system of claim 13, wherein the computer system automatically identifies line elements as rain gutters, cornices, ridge vents, or railings.

16. The system of claim 13, wherein the computer system automatically identifies panel elements as solar skylights, panels, entrances, garage doors, or windows.

17. The system of claim 13, wherein the computer system automatically identifies geometric shapes as roads, pools, sport courts, or trampolines.

18. The system of claim 13, wherein the computer system automatically identifies free shapes as trees or vegetation.

19. The system of claim 13, wherein the computer system refines the model based on annotations provided by the user.

20. The system of claim 19, wherein the computer system generates a list of items requiring repair based on the annotations provided by the user.

21. The system of claim 20, wherein the computer system receives insurance claim information based on the annotations provided by the user.

22. The system of claim 21, wherein the computer system generates and transmits a repair estimate for repairing the list of items requiring repair.

23. The system of claim 13, wherein the computer system automatically stores attributes associated with the automatically identified elements of the model.

24. The system of claim 13, wherein the computer system displays candidate features associated with a surface face of the three-dimensional model in the display based on a surface face selected by the user.

* * * * *